Patented Apr. 21, 1942

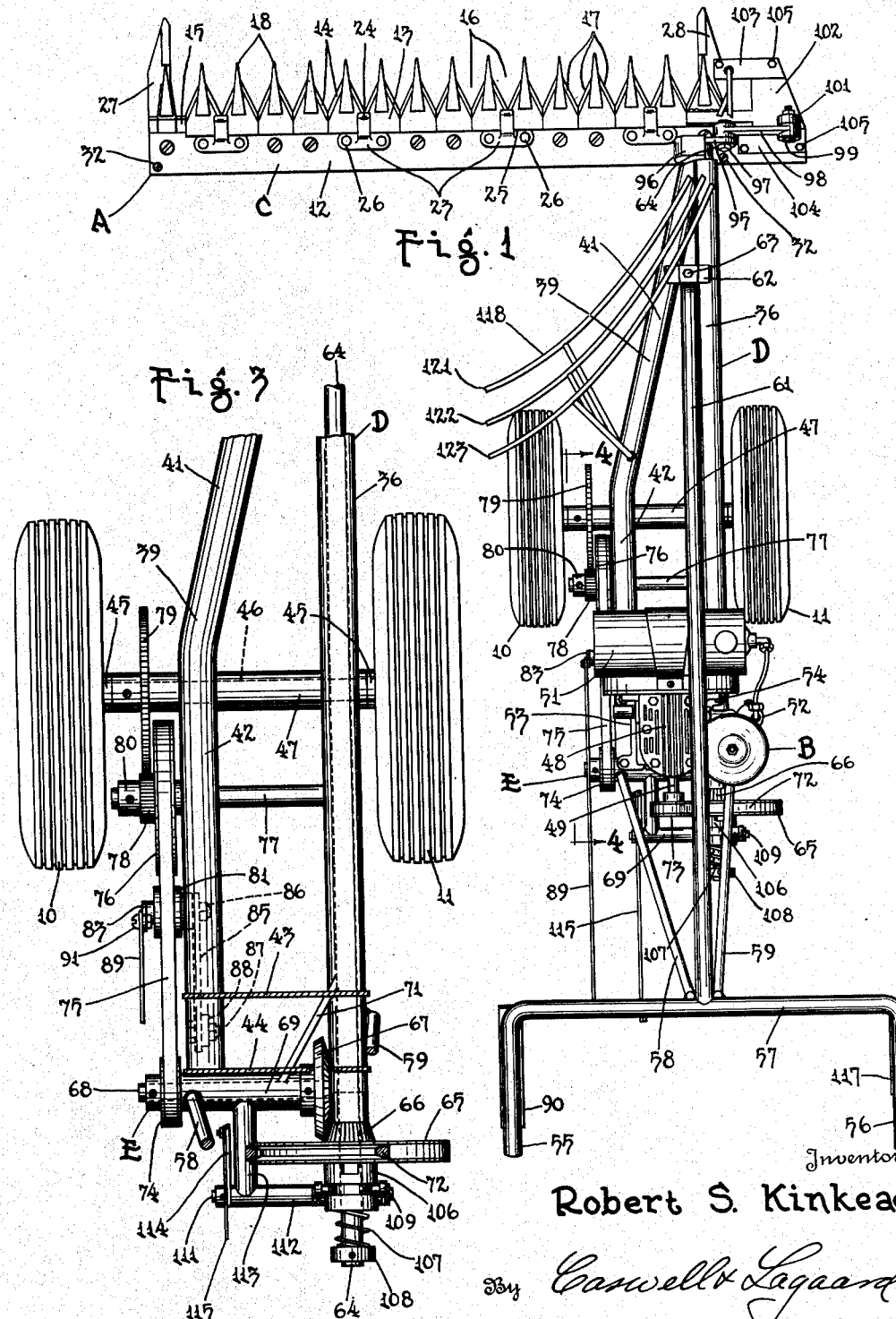

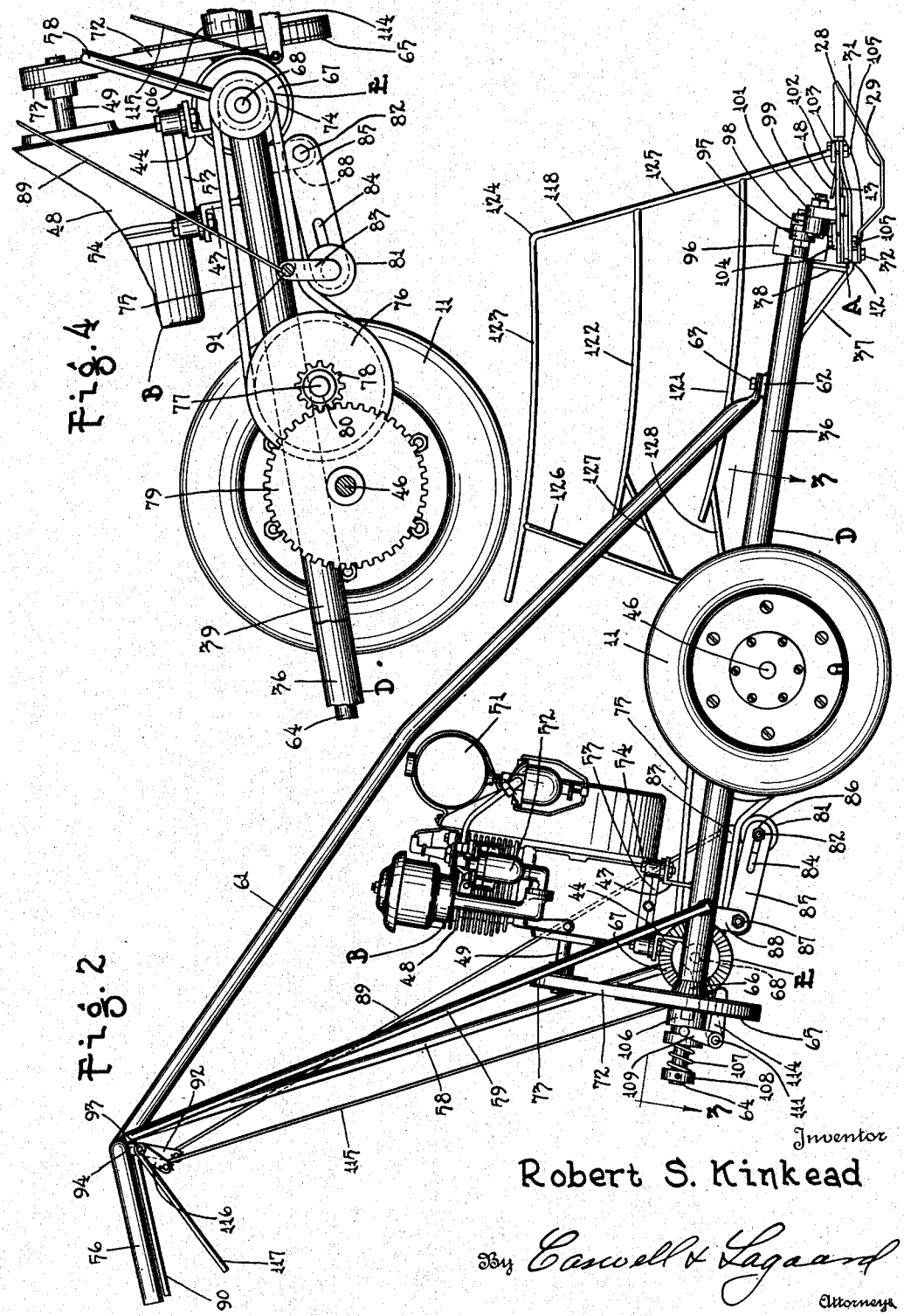

2,280,124

UNITED STATES PATENT OFFICE 2,280,124

MOWER

Robert S. Kinkead, St. Paul, Minn.

Application February 27, 1941, Serial No. 380,829

9 Claims. (Cl. 56—26.5)

My invention relates to mowers of the sickle type and has for an object to provide an extremely simple and practical construction by means of which vegetation may be readily cut by power.

Another object of the invention resides in providing a mower which is easy to handle and manipulate.

An object of the invention resides in providing a mower by means of which the supporting wheels travel over the swath cut by the sickle without laying down the uncut vegetation.

Another object of the invention resides in providing a mower in which the wheels do not interfere with the vegetation so that tall and heavy vegetation may be readily cut without hindrance.

An object of the invention resides in providing a mower which does not need to be balanced during operation whereby the operator may confine his activities to the steering of the mower.

Another object of the invention resides in providing a mower in which the power unit frame is connected to the sickle frame solely at one end of the sickle and in which a pair of supporting wheels are employed which are arranged to straddle the power unit frame.

A still further object of the invention resides in arranging the two wheels between the center of the sickle frame and the end of the sickle frame to which the second named frame is attached.

An object of the invention resides in constructing the second named frame with two frame members issuing substantially from the sickle frame at one locality and diverging rearwardly from the sickle frame to become spaced from one another at a locality rearwardly of the sickle.

A feature of the invention resides in arranging said wheels at a locality of said second named frame where the frame members thereof are spaced from one another.

An object of the invention resides in constructing said frame members with parallel portions disposed rearwardly of said wheels and on which the power unit is supported.

A feature of the invention resides in constructing one of said frame members tubular and rectilinear, and in providing in said frame member a shaft or rod for operating the sickle.

A still further object of the invention resides in the construction by means of which the handle of the mower is attached to the second named frame.

An object of the invention resides in providing a deflector issuing rearwardly and laterally from the point of connection of the second named frame with the sickle frame and to a position inwardly of the innermost wheel to deflect the vegetation cut inwardly and away from said wheel to a position in the swath clearing said wheel.

Other objects of the invention reside in the novel combination and arrangement of parts and in the details of construction hereinafter illustrated and/or described.

In the drawings:

Fig. 1 is a plan view of a mower illustrating an embodiment of my invention.

Fig. 2 is an elevational view of the structure shown in Fig. 1.

Fig. 3 is a fragmentary plan sectional view taken on line 3—3 of Fig. 2.

Fig. 4 is a fragmentary elevational sectional view taken on line 4—4 of Fig. 1.

My invention comprises a cutting mechanism which I have indicated in its entirety by the reference character A, and a power unit B which operates the same. The cutting mechanism A includes a frame C, while the power unit B is mounted on a frame D connected to the frame C, near one end of the same, and extending rearwardly of the cutting mechanism. The frame D is partly supported through supporting wheels 10 and 11 attached thereto. A suitable power transmission E drives the wheels 10 and 11 and also the cutting mechanism D. These various parts will now be described in detail.

The frame C of cutting mechanism A includes a transversely extending frame member 12 which is constructed in the form of a rectilinear bar. All of the parts of the cutting mechanism including the sickle proper are carried by this bar. The cutting mechanism includes a sickle 13 which comprises a number of sickle sections or cutters 14 which are arranged adjacent one another and which are riveted or secured to a sickle bar designated by the reference numeral 15. Sections 14 are constructed V-shaped in form to leave V-shaped notches 16 therebetween into which the grass or vegetation to be cut may enter. The edges 17 of the sickle sections are sharpened so that said edges serve to cut the vegetation when the sickle bar 15 is reciprocated.

Attached to the underside of the frame member 12 are a number of pointed guards 18 which are secured to said frame member in any suitable manner. These guards are slotted to receive the cutters or sickle sections 14 and serve to guide the same in the customary manner. Said guards have attached to them cutter plates on which the sickle rests and which cooperate with said sickle sections to cut the vegetation entering the notches 16. This construction forming no particular feature of the invention has not been shown in detail in the drawings though it can readily be comprehended that the usual sickle construction now well known in the art may be employed for the purpose. The sickle 13 is held in proper contact with these cutter plates by means of a number of clips 23 which are riveted to the frame member 12 by means of rivets 26. These clips have fingers 24 which overlie the sickle sections or cutters 14 and hold the same in contact with the cutter plates. The sickle bar 15 is further guided by means of shoulders 25 formed on the clips 23 and which engage the sickle bar at the rearward edge thereof.

The cutting mechanism A further comprises two shoes 27 and 28, best shown in Figs. 1 and 2. These shoes are formed with runners 29 which rest upon the surface over which the mower travels, said runners having upturned portions 31 at their forward ends. The shoes 27 and 28 are bolted to the frame member 12 by means of bolts 32.

The frame D consists of a rearwardly extending rectilinear tubular frame member 36 which is disposed in a slightly upwardly inclined position. This frame member is secured to the frame member 12 of the frame C by means of a bracket 37 and a brace 38, which are welded to the frame members 12 and 36. The said bracket and brace are arranged so that the forward end of the frame member 36 is disposed somewhat above the frame member 12 and terminates at a locality substantially at the rearward edge of said frame member 12. The frame D also includes a second rearwardly extending tubular frame member 39 which has a converging portion 41 connected to the frame member 36 at the forward end thereof and in proximity to its locality of connection with the frame member 12. The frame member 39 has another portion 42 which is parallel with and spaced from the frame member 36. This portion and the frame member 36 are connected together at their rearward ends by means of two angle frame members 43 and 44 which are arranged with one flange spaced from and parallel to the plane of the frame D, as shown in Fig. 2. The other flanges of these angle frame members engage the upper surfaces of the frame members 39 and 36 and are welded thereto.

The mower is supported rearwardly of the cutting mechanism A by means of the two supporting wheels 10 and 11 previously referred to. These wheels are preferably rubber tired wheels which are provided with hubs 45 receiving an axle 46. The wheel 10 is rigidly secured to the axle 46, while the wheel 11 may be rotatably mounted thereon or rigidly secured thereto, as desired. The axle 46 is rotatably mounted in a tubular bearing 47 which is welded to the undersides of the frame members 39 and 36 at the locality where the bend between the portions 41 and 42 of the frame member 39 occur. The two wheels 10 and 11 straddle the frame D and are closely positioned adjacent said frame members 39 and 36 and fall within the space between the middle of the cutter frame C and the end thereof to which the frame D is attached.

The power unit B consists of a gasoline engine 48 which is provided with a crank shaft 49 operated in the usual manner from the piston and crank of the engine. Said power unit further includes a gasoline tank 51 which delivers gasoline to a carburetor 52 from which the gasoline is directed into the engine. The engine 48 includes a base 53 which is bolted to the flanges of the two angle frame members 44 and 43 by means of bolts 54. The engine is so situated that the crank shaft 59 thereof extends parallel to the tubular frame member 36.

For the purpose of steering the mower two spaced handles 55 and 56 are employed which are attached to a handle bar 57. Two uprights 58 and 59 are welded at their upper ends to the handle bar 57. The lower end of the upright 59 is welded to the frame member 36, while the lower end of the upright 58 is welded to another portion of the frame D to be presently described. The handle bar 57 is braced by means of a brace 61 which is welded to the handle bar 57 and extends downwardly to the frame D. This frame is provided with a cross piece 62 welded thereto and the end of the brace 61 is secured to said cross piece by means of a screw or bolt 63 which passes through the cross piece 62 and is attached thereto.

The mower is propelled by means of the transmission E now to be described. Disposed within the tubular frame member 36 is a shaft 64 which is journaled in bearings provided in the end of said tubular frame member which have not been shown in the drawings. This shaft has rotatably mounted on the rearward end of it a pulley 65 which has attached to it a bevel pinion 66. The bevel pinion 66 meshes with a bevel gear 67 mounted on a transverse shaft 68 rotatably journaled in a bearing 69. The bearing 69 is tubular in form and is welded to the end of the frame member 39 and extends up to but falls short of the frame member 36. A brace 71 welded to the bearing 69 and also to the frame member 36 connects the said bearing to said frame member and provides a rigid construction. The pulley 65 is driven by means of a V-belt 72 which passes over said pulley and over another pulley 73 fast on the crank shaft 49 of the engine 48. The bevel gear 67 is attached to one end of shaft 68, while the other end of said shaft has a pulley 74 rigidly secured to it. A V-belt 75 passes over the pulley 74 and also over another pulley 76 rotatably mounted on the end of a stud 77 disposed beneath and welded to the two frame members 39 and 36. The pulley 76 has secured to it a spur pinion 78 which meshes with a spur gear 79 fast on the axle 46. A collar 80 on the stud 77 holds the pulley 76 and the gear 78 in place thereon. By means of this construction the wheel 10 is rotated and the mower propelled.

Operating in conjunction with the V-belt 75 is an idler pulley 81, best shown in Figs. 2 and 4. This pulley is rotatably mounted on a stud 82 which is welded to an arm 83. The stud 82 extends through a slot 84 in another arm 85 and is rigidly secured in said slot to said arm by means of a nut 86 screwed to the outer end of said stud. The arm 85 is pivoted by means of a pintle 87 to a bracket 88 welded to the underside of the frame member 39. A link 89 is pivotally connected by means of a pintle 91 to the arm 83 and is further connected to a lever 92 pivoted at 93 to a lug 94 welded to the handle bar 57. A hand piece 90 forms part of the lever 92 and serves to move the link 89 to raise and lower arm 85 and tighten the belt 75 through the action of the idler pulley 81. It will thus be comprehended that, when the hand piece 90 is up, as shown in Fig. 2, the belt 75 is tightened and the mower is propelled and when lowered the mover stops.

The sickle 13 is driven in the following manner: At the forward end of the shaft 64 is provided a crank arm 95 which is rigidly secured thereto and which is formed with a counterweight 96. This crank arm has pivoted to it by means of a pintle 97, best shown in Fig. 1, a link 98. Link 98 is in turn pivoted by means of a pintle 99 to a lug 101 welded to a plate 102 which in turn is welded to the sickle 13. The plate 102 is guided for movement by means of two guides 103 and 104 which are secured to the frame member 12 by means of machine screws 105. As the crank arm 95 swings the same reciprocates the sickle bar 15 and procures operation of the cutting mechanism A.

The shaft 64 is driven from the pulley 65 by means of a clutch 106. This clutch is adapted to be thrown into engagement by a compression coil spring 107 encircling the shaft 64 and operating against a collar 108 at the end of said shaft. Said clutch may be disengaged by means of a fork 109 which is rigidly secured to a shaft 111. Shaft 111 is rotatably mounted in a bearing 112 which is secured to a stud 113 welded to the bearing 69. The brace 58 of the handle bar 57, previously referred to, is also welded to this bearing as clearly shown in Fig. 3. The shaft 111 has secured to it an arm 114 which has pivoted to it a link 115. This link is in turn pivoted to a lever 116 which in turn is pivoted in a manner similar to the lever 92. The said lever includes a hand piece 117 by means of which the said lever may be operated and the clutch 106 disengaged.

At the forward end of the frame D is provided a deflector 118 which consists of three or more rods 121, 122 and 123. The rod 123 is formed at its forward end with a bend 124 and has a leg 125 which extends downwardly and is welded to the guide 103 located at the forward portion of the cutting mechanism A. The rods 122 and 121 are welded to the leg 125 of rod 118 and all three of said rods are braced at their rearward ends by means of braces 126, 127 and 128, which are welded to the frame member 39. The various rods 121, 122 and 123 of deflector 118 extend rearwardly and inwardly so that they deflect the vegetation cut by the sickle inwardly and away from the wheel 10.

The operation of the invention is as follows: The operator controls the operation of the cutting mechanism by means of the hand piece 117 and the propulsion of the mower by means of the hand piece 90. When the mower is being propelled and the cutting mechanism operates the operator merely has to steer the mower. As the grass or other vegetation is being cut the same is thrown inwardly toward the center of the swath and past the wheel 10 by means of the deflector 118. Thus the vegetation is kept away from the wheels and the mower is capable of cutting extremely tall and heavy vegetation which would ordinarily choke a mower having wheels at the two sides of the cutting mechanism.

The advantages of my invention are manifest. The mower is extremely simple and practical in construction and can be built at relatively low cost. By means of the arrangement shown, tall and heavy vegetation may be easily and effectively cut. The device is self-balanced so that greater stability is procured than where a mower having but a single rear wheel is employed. By means of the deflector used and with the arrangement of wheels shown the vegetation is discharged entirely away from the wheels so that entanglement of the vegetation with the wheels and operating mechanism of the mower is entirely prevented.

Changes in the specific form of my invention, as herein disclosed, may be made within the scope of what is claimed without departing from the spirit of my invention.

Having described my invention, what I claim as new and desire to protect by Letters Patent is:

1. A mower comprising a sickle and a frame therefor, a pair of wheels disposed rearwardly of the sickle and between one end and the center of the sickle frame, a second frame supported by said wheels and connected to the sickle frame solely at the end thereof nearest said wheels whereby the vegetation cut is free from said second frame, a power unit supported by said wheels, means for driving one of said wheels from the power unit, and means for driving the sickle.

2. A mower comprising a sickle and a frame therefor, a pair of wheels disposed rearwardly of the sickle and between one end and the center of the sickle frame, a second frame supported by said wheels and connected to the sickle frame solely at the end thereof nearest said wheels, a deflector carried by one of said frames and commencing at a locality in proximity to the locality of connection of the second frame to the sickle frame, said deflector extending rearwardly and laterally toward the center of the sickle frame and terminating at the locality of the innermost wheel said deflector deflecting the vegetation cut inwardly of the innermost wheel, a power unit supported by said wheels, means for driving one of said wheels from the power unit, and means for driving the sickle.

3. A mower comprising a sickle and a frame therefor, a second frame comprising two frame members extending rearwardly of the sickle frame and joined to the sickle frame at substantially one locality near one end of the sickle frame, said frame members being spaced from one another at a locality rearwardly of the sickle frame, a pair of wheels straddling said frame members at such locality and supporting said second named frame, said wheels being disposed between the ends of the sickle frame, a power unit supported by said wheels, means for driving one of said wheels from the power unit, and means for driving the sickle.

4. A mower comprising a sickle and a frame therefor, a second frame comprising two frame members extending rearwardly of the sickle frame and joined to the sickle frame at substantially one locality near one end of the sickle frame, said frame members being spaced from one another at a locality rearwardly of the sickle frame, a pair of wheels straddling said frame members at such locality and supporting said second named frame, said wheels being disposed between the center of the sickle frame and the end of the sickle frame to which the second named frame is attached, a power unit carried by said second named frame and disposed rearwardly of said wheels, means for driving one of said wheels from the power unit, and means for driving the sickle.

5. A mower comprising a sickle and a frame therefor, a second frame comprising a tubular frame member connected to the sickle frame near one end thereof and extending in a rectilinear direction rearwardly of the sickle frame, a second frame member following along said first named frame member and being closely positioned relative thereto at the locality of attachment of the first named frame member to the sickle frame, said second named frame member diverging from the first named frame member and being spaced from the first named frame member at a locality rearwardly of the sickle frame, a pair of wheels straddling said frame members of the second named frame at such locality, a power unit supported by said frame members of said second named frame, means for driving one of said wheels from the power unit, and means for driving the sickle.

6. A mower comprising a sickle and a frame therefor, a second frame comprising a tubular frame member connected to the sickle frame near one end thereof and extending in a rectilinear direction rearwardly of the sickle frame, a second frame member following along said first named frame member and being closely positioned relative thereto at the locality of attachment of the first named frame member to the sickle frame, said second named frame member diverging from the first named frame member and being spaced from the first named frame member at a locality rearwardly of the sickle frame, a pair of wheels straddling said frame members of the second named frame at such locality, a power unit supported by said frame members of said second named frame, means for driving one of said wheels from the power unit, and means including an elongated member extending through said first named frame member for driving said sickle from said power unit.

7. A mower comprising a sickle and a frame therefor, a second frame comprising two frame members extending rearwardly of the sickle frame and joined to the sickle frame at substantially one locality near one end of the sickle frame, said frame members being spaced from one another at a locality rearwardly of the sickle frame, a pair of wheels straddling said frame members at such locality and supporting said second named frame, a deflector carried by said second named frame and commencing at a locality in proximity to the locality of connection of the second named frame to the sickle frame and extending rearwardly and laterally toward the center of the vehicle and terminating inwardly of the innermost wheel, and braces attached to the innermost of the frame members of said second named frame for supporting said deflector at the innermost end thereof, a power unit supported by said wheels, means for driving one of said wheels from the power unit, and means for driving the sickle.

8. A mower comprising a sickle and a frame therefor, a second frame comprising two frame members extending rearwardly of the sickle frame and joined to the sickle frame at substantially one locality near one end of the sickle frame, said frame members having diverging portions issuing from the point of connection of the second named frame to the sickle frame, and parallel portions issuing rearwardly from the diverging portions, a pair of wheels straddling said frame members substantially at the intersection between the parallel and diverging portions of said frame members, a power unit carried by the parallel portions of said frame members, means for driving one of said wheels from the power unit, and means for driving the sickle.

9. A mower comprising a sickle and a frame therefor, a second frame comprising two frame members extending rearwardly of the sickle frame and joined to the sickle frame at substantially one locality near one end of the sickle frame, said frame members having diverging portions issuing from the point of connection of the second named frame to the sickle frame, and parallel portions issuing rearwardly from the diverging portions, a pair of wheels straddling said frame members substantially at the intersection between the parallel and diverging portions of said frame members, a power unit carried by the parallel portions of said frame members, a vertical frame extending upwardly from said second named frame, a handle carried by said vertical frame and a brace extending between said vertical frame and second named frame, means for driving one of said wheels from the power unit, and means for driving the sickle.

ROBERT S. KINKEAD.